(12) United States Patent
Hisada et al.

(10) Patent No.: US 6,863,946 B2
(45) Date of Patent: Mar. 8, 2005

(54) OPTICAL INFORMATION RECORDING MEDIUM, METHOD FOR MANUFACTURING THE SAME, AND METHOD FOR RECORDING AND/OR REPRODUCING OPTICAL INFORMATION

(75) Inventors: Kazuya Hisada, Osaka (JP); Kazuhiro Hayashi, Kadoma (JP); Eiji Ohno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 99 days.

(21) Appl. No.: 10/314,066

(22) Filed: Dec. 5, 2002

(65) Prior Publication Data
US 2003/0108711 A1 Jun. 12, 2003

(30) Foreign Application Priority Data

Dec. 7, 2001 (JP) ........................................ 2001-373683

(51) Int. Cl.⁷ ................................................ B32B 3/02
(52) U.S. Cl. ...................... 428/64.1; 428/64.4; 428/688
(58) Field of Search ................................ 428/64.1, 64.4, 428/688, 913; 430/270.11, 495.1, 945

(56) References Cited

U.S. PATENT DOCUMENTS

| 5,311,500 A | | 5/1994 | Higuchi et al. |
| 5,490,131 A | * | 2/1996 | Ohta et al. ................ 369/275.5 |
| 6,128,274 A | * | 10/2000 | Mori et al. ............... 369/275.5 |

FOREIGN PATENT DOCUMENTS

| EP | 0 467 705 | 1/1992 |
| JP | 7-141696 | 6/1995 |
| JP | 7-244887 | 9/1995 |
| JP | 9-180259 | 7/1997 |
| JP | 9-180254 | 11/1997 |

* cited by examiner

*Primary Examiner*—Elizabeth Mulvaney
(74) *Attorney, Agent, or Firm*—Merchant & Gould P.C.

(57) ABSTRACT

The present invention presents an optical information recording medium in which deformations brought about by changes to the environmental conditions are suppressed. The recording medium includes a transparent resin layer, a resin substrate that is thicker than the transparent resin layer, and an information recording layer disposed between the transparent resin layer and the resin substrate. A moisture absorption prevention film is formed on at least a portion of an outer principal surface of the resin substrate.

21 Claims, 8 Drawing Sheets

OPTICAL INFORMATION RECORDING MEDIUM, METHOD FOR MANUFACTURING THE SAME, AND METHOD FOR RECORDING AND/OR REPRODUCING OPTICAL INFORMATION

FIELD OF THE INVENTION

The present invention relates to optical information recording media, methods for manufacturing the same, and methods for recording and/or reproducing optical information using such a medium. The present invention relates in particular to optical information recording media in which warping due to changes in environmental conditions is suppressed.

BACKGROUND OF THE INVENTION

Optical information recording media can be classified roughly into read-only, write-once and rentable media. Examples of read-only optical information recording media include compact disks (CDs) on which audio data are recorded and laser disks (LDs) on which video data are recorded. Write-once optical information recording media are used for storing document files and still-picture files, and rentable optical information recording media are used to store data files in personal computers. The structure of such optical disks is that of a transparent resin substrate of 1.2 mm thickness provided with an information layer that is protected with an overcoat layer, or that of two transparent resin substrates of 1.2 mm thickness of which one or both are provided with an information recording layer and that are laminated together.

Large-capacity digital versatile disks (DVDs) on which not only audio data but also video data can be stored are becoming widespread. In order to record data at larger densities, it is necessary to make the wavelength of the laser light shorter, and to increase the numerical aperture (NA) of the objective lens. However, shorter wavelengths and greater NA lead to a narrower tolerance of the angle of inclination (tilt) of the disk with respect to the irradiation direction of the laser light. In order to increase the tolerance for tilt, it is advantageous to make the substrate thinner on the side where the laser light is irradiated. For example, under the present DVD standard, the wavelength of the laser light is 650 nm, the NA is 0.60, and the substrate thickness is 0.6 mm. The mechanical strength of resin substrates of 0.6 mm thickness is low, so that in DVDs, two substrates are laminated together, and an information recording layer is sandwiched between the two substrates.

It is expected that with the start of terrestrial digital broadcasts, the need for optical disks with capacities of about 25 GB will grow even larger. To realize capacities of that order with optical disks that are of approximately the same size as CDs and DVDs, it has been suggested to set the wavelength of the laser light to about 400 nm and the numerical aperture of the objective lens to about 0.85. In that case, when the thickness of the substrate on the side on which laser light is irradiated is set to about 0.1 mm, then a tolerance for tilt can be ensured that is about the same as with current DVDs.

When the thickness of one substrate is set to 0.1 mm, then, in order to maintain compatibility with DVDs, the thickness of the other substrate must be set to 1.1 mm. Increasing the asymmetry of the two substrates leads to the problem of deformation of the optical disks brought about by changes in environmental conditions, in particular changes in the humidity. This is because the recording/reproducing characteristics are affected when the tilt becomes large due to deformation of an optical disk.

SUMMARY OF THE INVENTION

It is an object of the present invention to provide an optical information recording medium, in which deformations due to changes in environmental conditions are suppressed. It is another object of the present invention to provide a method for manufacturing such a medium as well as a method for recording and/or reproducing optical information on such a medium.

An optical information recording medium in accordance with the present invention includes a transparent resin layer, a resin substrate that is thicker than the transparent resin layer, and an information recording layer disposed between the transparent resin layer and the resin substrate. A moisture absorption prevention film is formed on at least a portion of an outer principal surface of the resin substrate.

The present invention further provides a method for manufacturing such an optical information recording medium. This method includes forming at least the information recording layer on one of the two principal surfaces of the resin substrate, forming the transparent resin layer such that the information recording layer is disposed between the resin substrate and the transparent resin layer, disposing a scratch prevention film so as to cover the outer principal surface of the transparent resin layer, forming a moisture absorption prevention film on the outer principal surface of the resin substrate while the scratch prevention film is still disposed, and removing the scratch prevention film after forming the moisture absorption prevention film.

The present invention further provides a method for recording and/or reproducing optical information on such an optical information recording medium. According to this method, optical information is recorded and/or reproduced by irradiating laser light with a wavelength of at most 450 nm onto the information recording layer, taking the transparent resin layer as the incident side.

DESCRIPTION OF THE PREFERRED EMBODIMENTS

Figure 1:
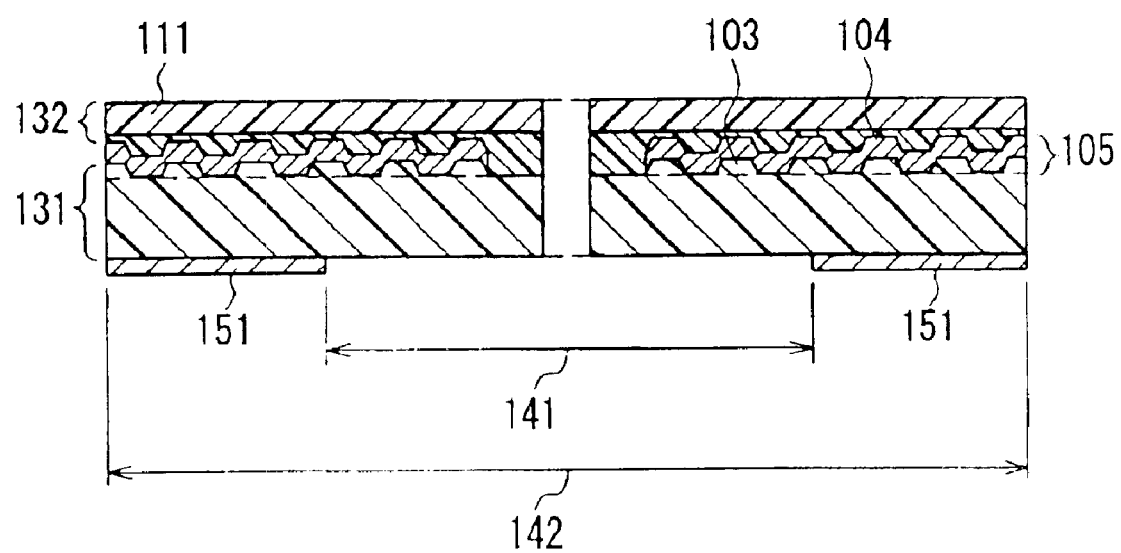
FIG. 1 is a cross-sectional view showing an embodiment of an optical information recording medium according to the present invention.

In an optical information recording medium according to the present invention, the moisture absorption prevention film formed on the resin substrate may serve as a first moisture absorption prevention film, and a second moisture absorption prevention film may be formed on at least a portion of the outer principal surface of the transparent resin layer.

When the first moisture absorption prevention film is formed covering the entire outer principal surface of the resin substrate, and the second moisture absorption prevention film is formed covering the entire outer principal surface of the transparent resin layer, then the moisture absorption of the medium can be suppressed considerably.

The transparent resin layer functions as an optically transmissive layer that transmits laser light. Consequently, it is preferable that the second moisture absorption prevention film formed on the transparent resin layer has a transmissivity of at least 90% with respect to laser light that is irradiated onto the information recording layer.

The moisture absorption prevention film may also include a dielectric material. With a dielectric material, it is easy to form a film by a vacuum film forming method, such as sputtering. A dielectric film can display the effect of moisture absorption prevention even at a film thickness of about 10 nm. Consequently, the moisture absorption prevention film may be a dielectric film with a film thickness of at least 10 nm, for example 10 nm to 200 nm. The moisture absorption prevention film may include at least one material selected from oxides, nitrides and sulfides. More specifically, it is preferable that the moisture absorption prevention film includes at least one material selected from $SiO_2$, $Al_2O_3$, SiN, AlN and ZnS as its principal component. These compounds are chemically stable and have low hygroscopicity. It should be noted that throughout this specification, "principal component" means a component that is contained in an amount of more than 50 mol %.

The moisture absorption prevention film also may include other materials besides the dielectric material. For example, the moisture absorption prevention film may include a resin material with a hygroscopicity that is lower than that of the material constituting the resin substrate. An example of a material whose hygroscopicity is lower than that of polycarbonate, which is a typical material of resin substrates, is vinylidene chloride. It should be noted that hygroscopicity can be determined with the value (in $g/m^2 \cdot 24$ hr) measured by Japanese Industrial Standard (JIS) Z-0208.

Thus, it is preferable that the moisture absorption prevention film is made of a material whose hygroscopicity based on the value measured by JIS Z-0208 is lower than that of the material constituting the resin substrate (typically polycarbonate), for example one of the materials listed above.

It is preferable that the transparent resin layer includes at least one resin selected from resins curable by radiation and adhesive resins. Here, "resins curable by radiation" means resins that can be cured by any kind of electromagnetic waves, such as UV light or heat rays, and refers for example to ultraviolet curing resins (UV curing resins).

The transparent resin layer may be made of at least one layer selected from resins curable by radiation and adhesive resins. However, a further resin substrate may be included on the outer side of this layer.

If the thickness of the resin substrate is at least three times, or even ten times larger than the thickness of the transparent resin layer, then deformations of the medium can be suppressed by applying the present invention. If the transparent resin layer is thin, then it becomes easy to ensure the tolerance value of the tilt. For this reason, the thickness of the transparent resin layer should be not greater than 0.3 mm. However, considering current mass production technology and the necessary strength, it is preferable that the transparent resin layer is at least 2 μm, more preferably at least 30 μm thick. Considering compatibility with conventional media, the total of the thickness of the resin substrate and the thickness of the transparent resin layer should be 1.2 mm, or, considering tolerances, 1.2 mm±0.1 mm. Following these figures, if the thickness of the transparent resin layer is at most 0.3 mm, then the thickness of the resin substrate is at least 0.9 mm.

It should be noted that, as mentioned below, guide grooves for laser light are sometimes formed on the inner principal surface of the resin substrate. In that case, the thickness of the resin substrate is, strictly speaking, the distance from the outer principal surface to a land surface (between the grooves) on the inner principal surface, and the thickness of the transparent resin layer is the distance between that land surface and the outer principal surface of the transparent resin layer.

The moisture absorption prevention film may be formed across the entire outer surface of the resin substrate, but it may also be formed in a predetermined pattern on a portion of the outer principal surface. Examples of suitable patterns are patterns of scattered dots, mesh patterns and band-shaped patterns. If the medium is disk-shaped, then a band-shaped (ring-shaped or donut-shaped) pattern is suitable, because it can make the hygroscopicity of the medium uniform in the circumferential direction.

The ratio of the region on which the moisture absorption prevention film is formed can be set as appropriate in accordance with the thickness and material of the resin substrate and the transparent resin layer, but ordinarily, the moisture absorption prevention film should be formed on a region of 35 to 85%, preferably 50 to 70%, of the surface area of the outer principal surface of the resin substrate. This ratio is the range that is suitable for the case that no moisture absorption prevention film is provided on the transparent resin layer, and the moisture absorption prevention film is formed only on the outer principal surface of the resin substrate.

The transparent resin layer may include a protective layer as its outermost layer. Providing a protective layer makes it possible to prevent scratches on the surface of the transparent resin layer.

A balance layer made of the same material as the transparent resin layer further may be formed on the outer side of the moisture absorption prevention film. If a layer with substantially the same hygroscopicity as the transparent resin layer is provided, then it is possible to eliminate the reason for deformations of the medium.

The present invention may be applied also to media including two or more information recording layers. For example, with the information recording layer serving as a first information recording layer, a second information recording layer may be disposed between the first information layer and the transparent resin layer, and a separation layer may be disposed between the first information recording layer and the second information recording layer.

The following is an explanation of preferred embodiments of the present invention, with reference to the drawings.

In the optical disk in FIG. 1, guide grooves 103 are formed on the inner principal surface of a disk-shaped resin substrate 131. Formed on this principal surface is a recording layer 104, on which a transparent resin layer (optically transmissive layer) 132 is disposed. On the outer principal surface of the resin substrate 131, that is, in the principal surface to the opposite side of the transparent resin layer 132, a band-shaped (ring-shaped) moisture absorption prevention film 151 is formed. This band-shaped region can be characterized by an inner diameter 141 and an outer diameter 142, as shown in FIG. 1.

The recording layer 104 includes for example a layer that changes to an optically different state when irradiated with laser light. The recording layer 104 may be a multi-layered film further including a protective layer, a reflective layer and/or an interference layer, as appropriate. In this optical disk, the recording layer 104 and the surface layer of a substrate 101 provided with the guide grooves 103 function as an information recording layer 105. When information is recorded only by surface shapes, such as pits, then it is also possible to form simply a reflective layer instead of the recording layer 104. In that case, the reflective layer and the surface layer of the substrate serve as the information recording layer 105.

In this optical disk, the information recording layer 105 is located away from the cross-sectional center of the disk, and the amount of moisture supplied from the environment to the resin material disposed on both sides is different. The moisture absorption prevention film 151 provided on the outer principal surface of the resin substrate 131 alleviates deformations of the medium due to this difference.

Referring to FIGS. 2A to 2G, the following is an example of a method for manufacturing this optical disk. As a first substrate 101 shown in FIG. 2A, a polycarbonate substrate formed, for example, by injection molding may be used. This substrate is molded into the shape of a disk with a center hole 102. Polycarbonate, a material that is widely used for optical disks, such as CDs and DVDs, is inexpensive and suitable for injection molding. However, instead of this material, it also is possible to use acrylic resins or polyolefin resins. Since the first substrate 101 is made of a substrate through which laser light is not transmitted, it may be made of a material without transmittance. On the substrate 101, a recording layer 104 is formed by sputtering or the like.

Figure 2A:
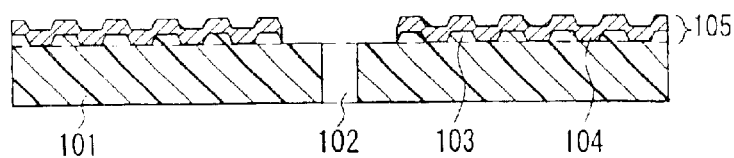
FIGS. 2A to 2G are cross-sectional views showing an example of a process for manufacturing an optical information recording medium according to the present invention.
Figure 2B:

Also a second substrate 111 shown in FIG. 2B is molded into the shape of a disk with a center hole 112. This substrate can be made by cutting it from a sheet that has been made by casting for example. There is no particular limitation to the material that can be used for this substrate, and it is possible to use polycarbonate, an acrylic resin, or a norbornene resin or the like. The second substrate 111 should be made thinner than the first substrate 101.

Figure 2C:
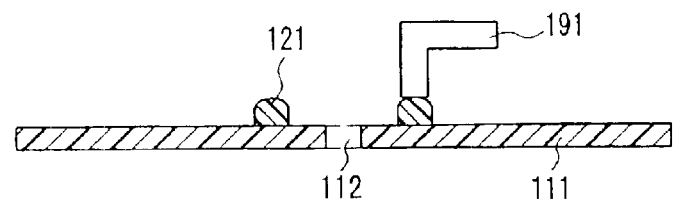
Figure 2D:
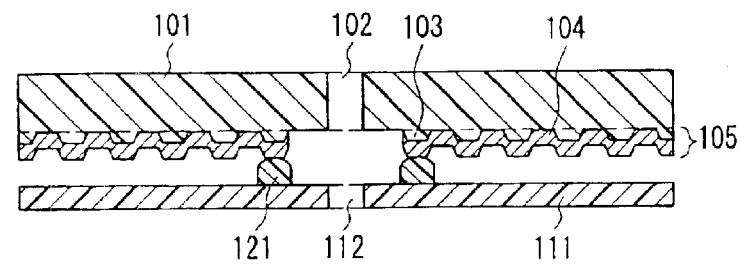

As shown in FIG. 2C, a UV curing resin 121 is applied on the second substrate 111. This resin 121 may be applied in a band shape near the center hole 121, using a nozzle 191. Then, as shown in FIG. 2D, the second substrate 111 and the first substrate 101 are laminated together, such that the centers of the two substrates coincide, and the surface on which the information recording layer 105 is formed and the surface on which the resin 121 has been applied are placed against one another. It should be noted that the UV curable resin can also be applied to the principal surface of the first substrate 101 instead of the second substrate 111.

Figure 2E:
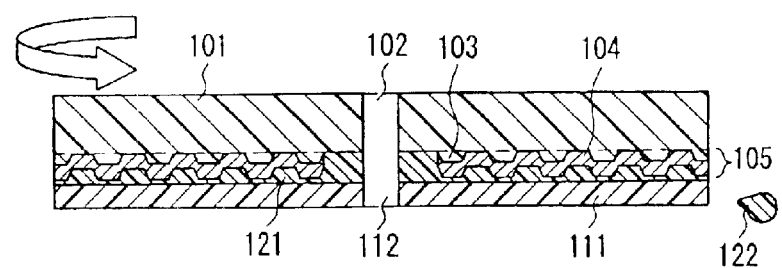
Figure 2F:
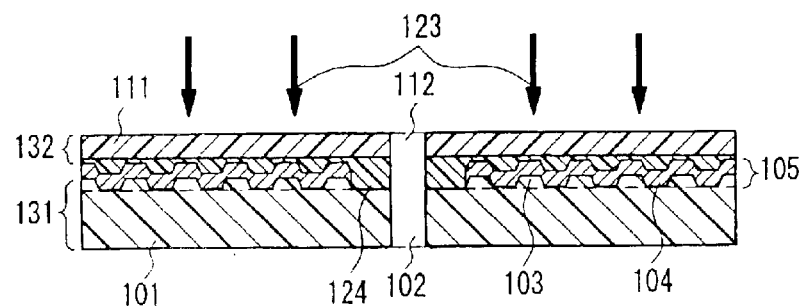
Figure 2G:
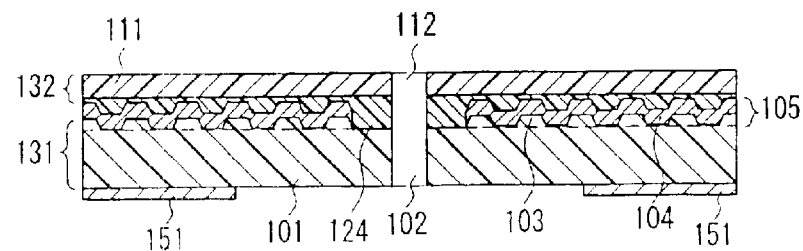

Subsequently, as shown in FIG. 2E, the two laminated substrates are rotated around the center holes 102 and 112, and the resin 121 is spread between the substrates by centrifugal force. Excess resin 121 may be discarded as droplets 122. It is preferable that this rotation is performed at a speed of about 1000 to 10000 rpm. With this application method, the thickness of the resin 121 between the substrates can be made uniform. Furthermore, as shown in FIG. 2F, UV light 123 is irradiated to cure the resin, and the substrates 101 and 111 are integrated into one by the cured resin film 124. This resin film 124 forms a part of the transparent resin layer 132. Finally, a moisture absorption prevention film 151 is formed on the outer principal surface of the first substrate 101, thus obtaining an optical disk as shown in FIG. 2G.

In this optical disk, the transparent resin layer is constituted by the second substrate 111 and the resin 124. However, there is no limitation to this, and the transparent resin layer also may be constituted by the second substrate 111, and an adhesive material (such as a pressure-sensitive adhesive sheet) for laminating the second substrate 111 to the first substrate 101, for example. The transparent resin layer also may be constituted only by a radiation curable resin, such as a UV curable resin.

In order to verify the effect of the moisture absorption prevention film, optical disks were fabricated by the method illustrated in FIGS. 2A to 2G. The first substrate 101 was made by injection molding of polycarbonate. The first substrate 101 was made into a disk of about 1.1 mm thickness, about 120 mm diameter, and provided with a center hole of about 15 mm diameter as well as guide grooves on its surface.

For the recording film 104, an AgPdCu film (80 nm), an AlCr film (10 nm), a ZnS—SiO$_2$ film (22 nm), a GeSiN film (5 nm), a GeSbTe film (10 nm), a GeSiN film (5 nm), and a ZnS—SiO$_2$ film (55 nm) were formed in that order from the side of the first substrate 101. Here, the figures in parentheses denote the thickness of each film. The GeSbTe film is a phase-changing recording film, which can be changed reversibly between a crystalline state and an amorphous state in response to irradiation with laser light. The ZnS—SiO$_2$ film is a protective film, and the AgPdCu film is a reflective film. The GeSiN film and the AgPdCu film are interface films preventing the diffusion of the films adjacent to them. The recording layer 104 is formed in a band-shaped region of 118 mm diameter.

The second substrate 111 is made by cutting a polycarbonate sheet obtained by casting. The second substrate 111 had a thickness of about 90 $\mu$m, a diameter of about 119.5 mm, and a center hole with a diameter of about 22 mm. The resin film 124 was formed by spinning the UV curing resin 121 applied to the second substrate at 8000 rpm for about 10 sec, and irradiating ultraviolet light from the second substrate side. The film thickness of the resin film 124 became about 10 $\mu$m.

For the moisture absorption prevention film 151, a ZnS—SiO$_2$ film (with a mole ratio of ZnS:SiO$_2$=80:10) was formed with a film thickness of 20 nm by sputtering on the outer principal surface of the first substrate 101. As shown in FIG. 1, the moisture absorption prevention film 151 was formed while adjusting its outer and inner diameter such that its outer diameter 142 substantially coincides with the outer diameter of the region on which the information recording layer 105 is formed, and its inner diameter 141 was set such that the film area attains a predetermined value. The outer diameter 142 was set to about 119 mm. For comparison, another optical disk was prepared in the same manner as described above, except that it was not provided with a moisture absorption prevention film.

Figure 3:
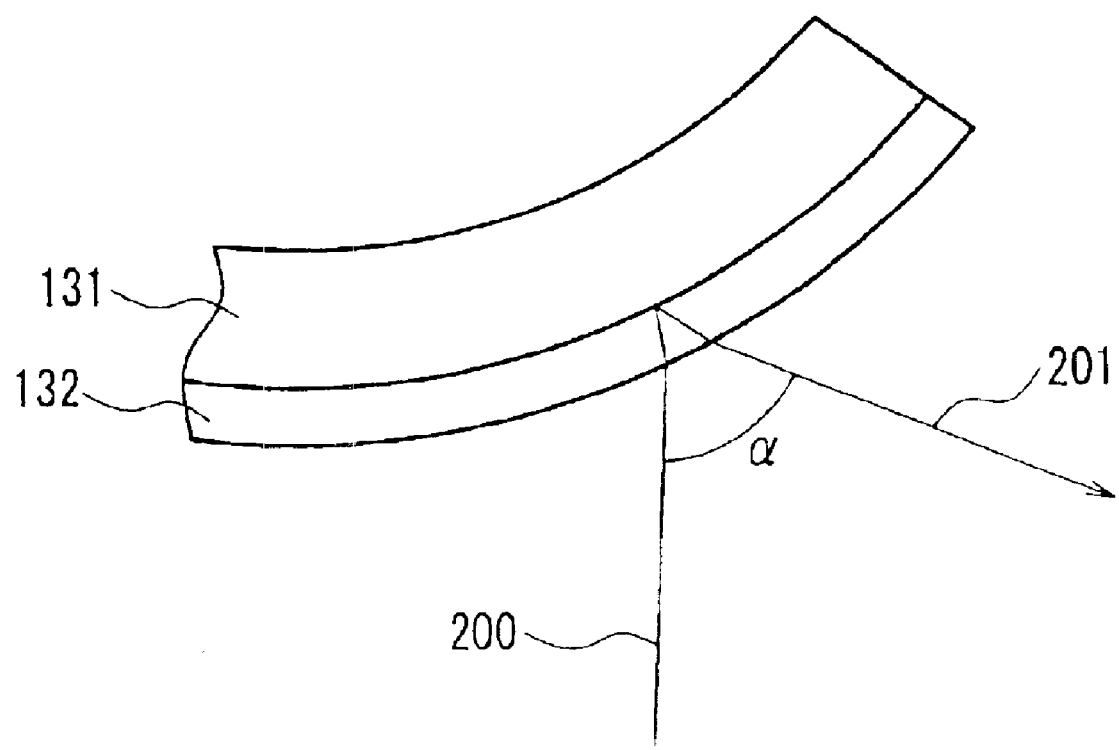
FIG. 3 is a cross-sectional view illustrating a method for measuring the tilt angle α.

The resulting optical disks were placed for over one week in a humid atmosphere of 30° C. temperature and 90% humidity, and then retrieved into a dry atmosphere of 25° C. ambient temperature and 50% humidity. Then, warping of the disks was measured for one day after retrieving them into the dry atmosphere. To evaluate warping, the tilt angle a of the optical disks was measured. As shown in FIG. 3, when the disk is placed such that the resin substrate 131 faces upward and laser light 200 is irradiated perpendicularly from below, then the tilt angle α is the angle defined by the irradiated laser light 200 and the reflected laser light 201. If the laser light is relected toward the outer side of the disk (see FIG. 3), then it is indicated as a positive value. The laser light was irradiated at a position 58 mm from the center of the optical disk. The results are listed in Table 1.

TABLE 1

| inner diameter (mm) | moisture absorption prevention film (inner diam./outer diam.) (%) | film area ratio (%) | tilt angle α (maximum) | |
|---|---|---|---|---|
| | | | −direction (°) | +direction (°) |
| 35 | 29 | 91 | 0.4 | 0 |
| 50 | 42 | 83 | 0.3 | 0 |
| 65 | 54 | 71 | 0.2 | 0 |
| 80 | 67 | 56 | 0.1 | 0.1 |
| 95 | 79 | 37 | 0 | 0.3 |
| — | — | 0 | 0 | 0.8 |

* "inner diam./outer diam." denotes the ratio between the inner diameter of the film formation region to the outer diameter of the medium
* "film area ratio" is the ratio of principal surface of the substrate that is taken up by the film formation area
* "tilt angle α" denotes the maximum value observed throughout the measurement period (1 day)

As shown in Table. 1, when the area ratio of the moisture absorption prevention film with respect to the principal surface of the first substrate is set to about 35 to 85% (or, in terms of inner diameter/outer diameter about 40 to 80%), then the tilt angle could be suppressed to 0.3° or less. When the area ratio was set to about 50 to 70% (or, in terms of inner diameter/outer diameter about 50 to 70%), then the tilt angle could be suppressed to 0.2° or less.

Furthermore, optical disks were fabricated in the same manner as described above, except that a SiN film (of 20 nm film thickness) was formed as the moisture absorption prevention film instead of the ZnS—SiO$_2$ film. When the tilt angle a of these optical disks was measured, it was found that similar results as in Table 1 were obtained. However, when the experiment of transferring the disks from a humid atmosphere to a dry atmosphere was repeated, the ZnS—SiO$_2$ film deteriorated gradually, and when the tilt angle α was measured after repeating this transfer five times, it was found that the effect of the ZnS—SiO$_2$ film formation had substantially vanished. On the other hand, when an SiN film was provided as the moisture absorption prevention film, then there was no change in its effect even when repeating the transfer, and substantially the same results as in Table 1 could be observed even after repeating the transfer ten times.

Furthermore, optical disks were prepared with an AlN film instead of the SiN film as the moisture absorption prevention film. Also in this case, as with the SiN film, moisture absorption prevention characteristics were observed that were substantially unchanged even after repeating the atmosphere transfer ten times. Thus, nitrides are more suitable as moisture absorption prevention films.

In these optical disks, the ratio of the thickness of the resin substrate to the thickness of the transparent resin layer was at least 10. When the difference of the thickness is enlarged to that extent, then the deformation of the disks accompanying an absorption or discharge of moisture from both outer principal surfaces becomes conspicuous. However, when the moisture absorption prevention film is formed, then the speed at which moisture is absorbed into the resin substrate is lowered, and as a result, the amount of water absorbed by the resin substrate is decreased. Moreover, when the moisture absorption prevention film is formed, then the region at which contraction occurs due to the discharge of moisture at the principal surfaces of the resin substrate can be restricted. Thus, it is possible to attain a balance between the contraction of the transparent resin layer and the contraction of the resin substrate. As its name says, the moisture absorption prevention film restricts the absorption of moisture in humid atmospheres, and functions as a film restricting the discharge of moisture in dry atmospheres.

Also when a film having SiO$_2$ as its principal component or a film having Al$_2$O$_3$ as its principal component was formed as the moisture absorption prevention film, then changes in the medium could be prevented as in the case of using a ZnS—SiO$_2$ film. The moisture absorption prevention film is not limited to dielectric inorganic materials as above, and it is also possible to use resin materials having a hygroscopicity that is lower than that of polycarbonate, such as vinylidene chloride.

In theory, it is possible to adjust the moisture absorption characteristics of the moisture absorption prevention film by changing not its area but its thickness. However, in practice, it is very difficult to control the thickness at the nm level. In particular in mass production processes, minuscule thickness variations among lots tend to arise. Therefore, to control the expansion of the transparent resin layer or the resin substrate and the deformation brought about by drying, it is preferable to provide the moisture absorption prevention film with a predetermined pattern. For example, by sputtering with a mask with a certain shape, it is possible to control the size of the region in which the moisture absorption prevention film is formed with high reproducibility.

In particular when using a disk-shaped substrate, it is possible to suppress local fluctuations of the moisture absorption characteristics in the circumferential direction when patterning in a band shape (ring shape). In that case, if the outer circumference of the band-shaped pattern is receded from the outer circumference of the substrate, then this may lead to the problem of local deformations near the outer circumference. Thus, it is preferable that the outer diameter of the band-shaped pattern is at least 90% of the outer diameter of the resin substrate, and in particular that it is greater than the outer diameter of the region in which the signal region layer is formed.

Figure 4:
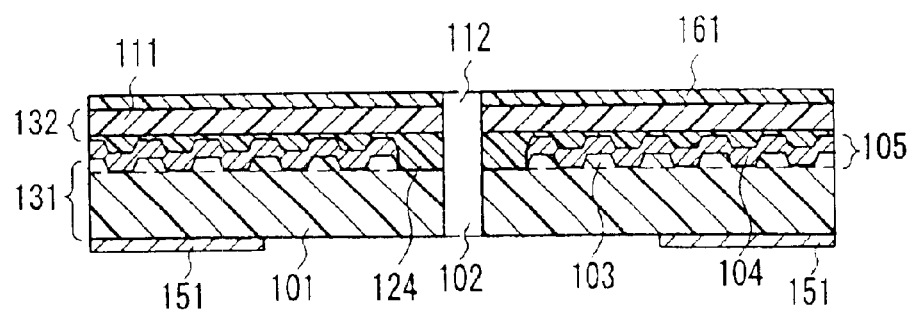
FIG. 4 is a cross-sectional view showing another embodiment of an optical information recording medium according to the present invention.

When forming the moisture absorption prevention film 151 on the outer principal surface of the resin substrate 131, it may happen that the outer principal surface of the transparent resin layer 132 is scratched during handling for example. In order to prevent this, it also is possible to prepare a scratch prevention film 161 covering the outer principal surface of the transparent resin layer 132, as shown in FIG. 4. The scratch prevention film 161 may be removed after the formation of the moisture absorption prevention film. In this manufacturing process, a polyethylene film of about 60 μm thickness was laminated with an acrylic adhesive onto the outer side of the transparent resin layer as a the scratch prevention film 161, but as long as the object of preventing scratches on the surface of the transparent resin layer is attained, there is no particular limitation to material, film thickness and lamination method. For example, it is also possible to temporarily laminate the scratch prevention film 161 simply using static electricity.

The scratch prevention film 161 may also be formed on one of the principal surfaces of the second substrate 111 before laminating it to the first substrate 101. In that case, the sheet material serving as the second substrate is placed over the sheet material (for example polyethylene film) serving as the scratch resistant film, and punched in the shape of the second substrate.

Figure 5:
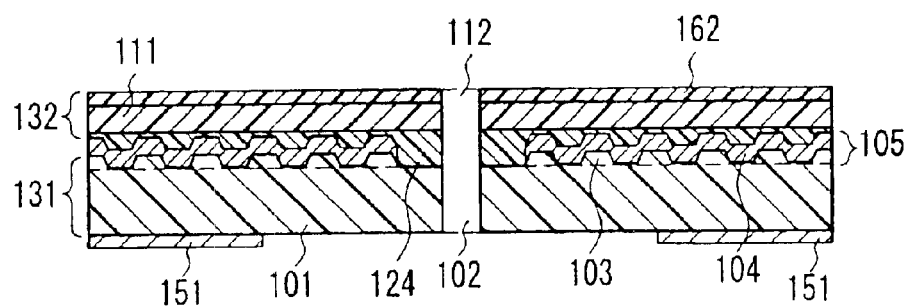
FIG. 5 is a cross-sectional view showing yet another embodiment of an optical information recording medium according to the present invention.

If the hardness of the surface of the transparent resin layer 132 is not sufficient or if the friction coefficient of the surface is large, then a protective film 162 may be formed on the outermost side of the transparent resin layer 132, as shown in FIG. 5. Different from the scratch prevention film, the protective film 162 is formed as a part of the transparent resin layer 132 and is not removed in the manufacturing process. The protective film may be formed by applying a UV curable hard coating material by spin coating and curing it by irradiating UV light.

It is also possible to use both a scratch prevention film and a protective film together. In this case, the scratch prevention film 161 should be in place at least during the formation of the moisture absorption prevention film 151 and until immediately before the formation of the protective film 162. It is preferable that the protective film 162 is formed after forming the scratch prevention film 161, forming the moisture absorption prevention film 151 and removing the scratch prevention film 161.

Figure 6:
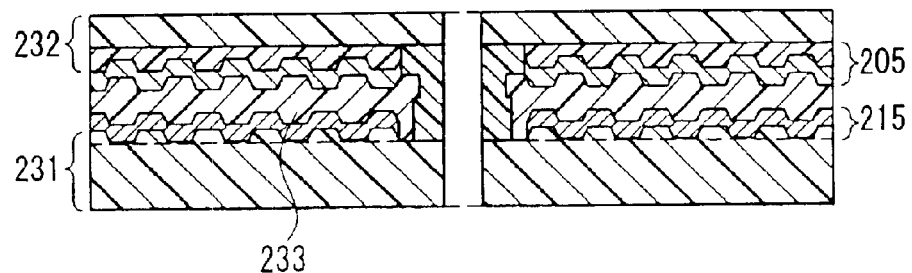
FIG. 6 is a cross-sectional view showing still another embodiment of an optical information recording medium according to the present invention.

A optical disk was described above, but the present invention also can be applied to write-once or read-only optical disks. For example in read-only disks, the information is formed as pits having grooves and lands of predetermined shape on the inner principal surface of the first substrate 101, and a reflective film is formed instead of the recording layer 104, but otherwise, read-only disks may be fabricated in the same manner as described above. The present invention also can be applied to optical disks having two or more information recording layers 105. For example, as shown in FIG. 6, it is possible to increase the surface density of the information recording by disposing two information recording layers 205 and 215 separated by a separation layer 233 between a resin substrate 231 and a transparent resin layer (a sheet member and an UV curing resin) 232.

The above-described optical disk was a phase-changing optical disk, but the present invention can be also applied to any medium using other recording, methods, such as magneto-optic disks. Furthermore, the substrate does not have to be disk-shaped, and the present invention also can be applied to such media as optical cards.

Figure 7A:
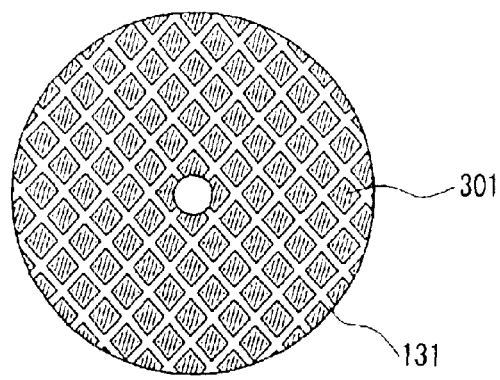
FIGS. 7A to 7F are plan views showing formation patterns of the moisture absorption prevention film in the optical information recording medium according to the present invention.

Moreover, as shown in FIG. 7A, optical disks were fabricated in the same manner as described above, except that the pattern of the moisture absorption prevention film 301 was scattered (dot-shaped). With this pattern, dots of equal shape were disposed uniformly across the entire surface of the resin substrate 131. A ZnS—SiO$_2$ film (with a mol ratio of ZnS:SiO$_2$=80:20) with 20 nm thickness was used for the moisture absorption prevention film 301. Various optical disks were fabricated in which the area ratio of the moisture absorption prevention film 301 to the outer principal surface of the resin substrate 131 was adjusted by changing the size of the dots. These optical disks were transferred to a dry atmosphere after exposing them to a humid atmosphere, and then the tilt angle α was measured. Atmospheres, exposure times and measurement methods were the same as above. The results are shown in Table 2.

TABLE 2

| area ratio of moisture absorption prevention film (%) | tilt angle α (maximum) | |
|---|---|---|
| | −direction (°) | +direction (°) |
| 90 | 0.4 | 0 |
| 80 | 0.3 | 0 |
| 70 | 0.2 | 0 |
| 60 | 0.1 | 0.1 |
| 50 | 0 | 0.2 |
| 40 | 0 | 0.3 |
| 0 | 0 | 0.8 |

* "film area ratio" is the ratio of principal surface of the substrate that is taken up by the film formation area
* "tilt angle α" & denotes the maximum value observed throughout the measurement period (1 day)

When the area ratio of the moisture absorption prevention film is 60% (size of the dots: 1 cm$^2$), then the tilt angle α is minimal. The pattern is different, but the value at which tilt angle α is minimal is about the same as in Table 1.

Figure 7D:
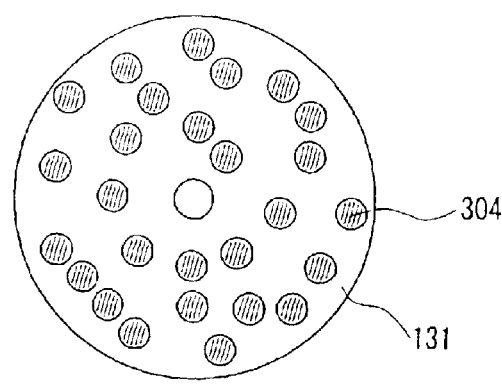
Figure 7B:
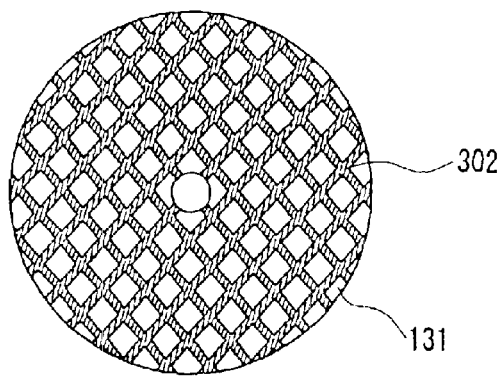
Figure 7E:
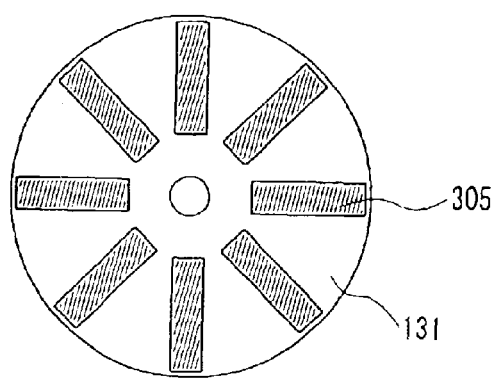
Figure 7C:
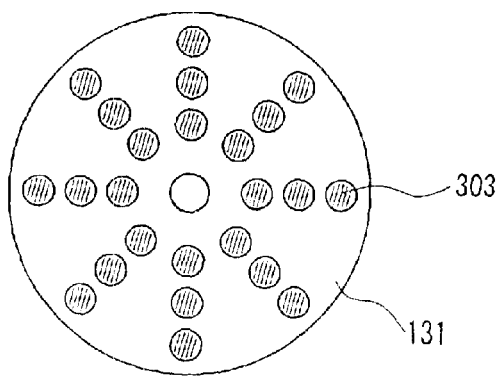
Figure 7F:
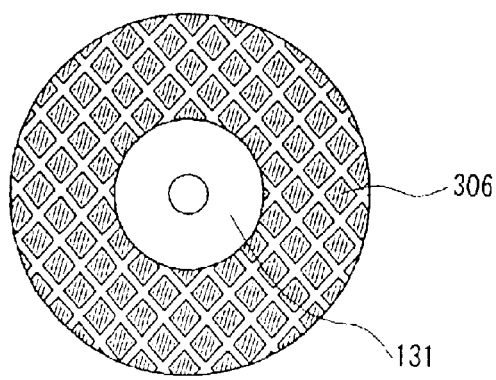

There is no limitation to the patterns with which the moisture absorption prevention film may be partially formed on the principal surface of the resin substrate 131. As shown in FIG. 7B, it is also possible to form a moisture absorption prevention film 302 with a mesh-shaped pattern. As shown in FIG. 7C, it is also possible to form the a moisture absorption prevention film 303 with a pattern in which scattered dots fan out in the radial direction. As shown in FIG. 7D, it is also possible to form a moisture absorption prevention film 304 with a pattern in which scattered dots are disposed randomly. As shown in FIG. 7E, it is further possible to form a moisture absorption prevention film 305 in which rectangular stripes are formed that spread radially from the disk center. When the pattern of FIG. 7A is formed only in a band-shaped region, then the moisture absorption prevention film 306 shown in FIG. 7F is attained.

Figure 8:
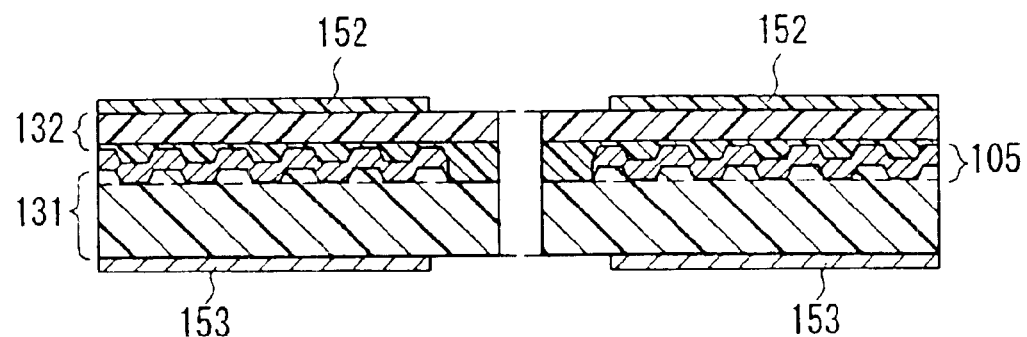
FIG. 8 is a cross-sectional view showing another embodiment of an optical information recording medium according to the present invention.

Furthermore, optical disks were fabricated in the same manner as described above, except that a moisture absorption prevention film (second moisture absorption prevention film) 152 also was formed on the outer principal surface of the transparent resin film 132, as shown in FIG. 8. For the moisture absorption prevention film (first moisture absorption prevention film) 153 on the resin substrate 131, a ZnS—SiO$_2$ film (with a mol ratio of ZnS:SiO$_2$=80:20) of 20 nm thickness was used. On the other hand, a ZnS—SiO$_2$ film (with a mol ratio of ZnS:SiO$_2$=80:20) of 10 nm thickness was used for the moisture absorption prevention film 152 on the transparent resin layer 132. This film has a transmissivity of laser light with a wavelength of 400 nm of at least 90%. The moisture absorption prevention films 152 and 153 were formed in band-shaped regions of 60 mm to 119 mm in the radial direction from the center of the disk. These optical disks were exposed to a highly humid atmosphere and then transferred to a dry atmosphere, and the tilt angle α was measured. Atmospheres, exposure times and measurement methods were the same as above. The resulting tilt angles a were at most ±0.05°.

If the second moisture absorption prevention film 152 is formed on the transparent resin layer 132, then it is preferable that its thickness is thin enough that the transmissivity of laser light passing through the transparent resin layer is at least 90%. On the other hand, if the film is too thin, then adequate moisture absorption prevention cannot be attained.

In contrast to the first moisture absorption prevention film, when the second moisture absorption prevention film 152 is formed in a detailed pattern of scattered dots or a mesh, then there is the risk that it locally affects the transmissivity of the laser light. Therefore, it is preferable that the second moisture absorption prevention film 152 is formed in a band-shaped pattern or that it is formed across the entire outer principal surface of the transparent resin layer. It is also possible to use for the second moisture absorption prevention film 152 a different material than for the first moisture absorption prevention film.

Figure 9:
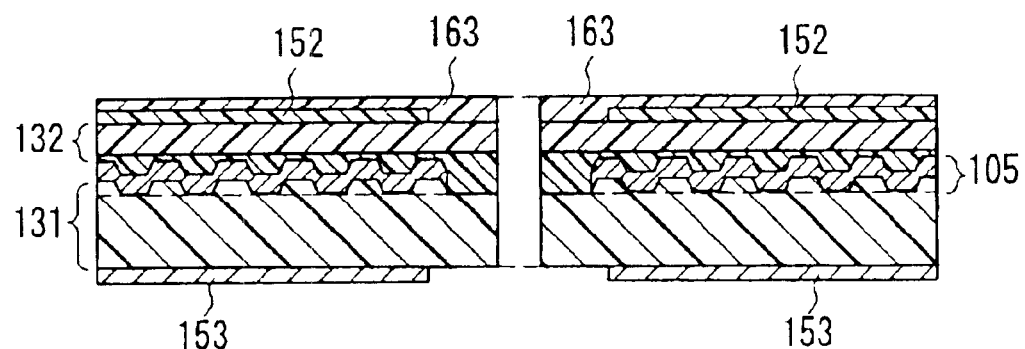
FIG. 9 is a cross-sectional view showing yet another embodiment of an optical information recording medium according to the present invention.

When the hardness of the second moisture absorption prevention film 152 is low and its friction coefficient is large, then there is the possibility that scratches on the surface affect the recording/reproducing properties. In such a case, a further protective film 163 may be formed on the moisture absorption prevention film 152, as shown in FIG. 9. Here, the protective film 163 may be formed by applying a UV curable hard coating material by spin coating and curing it by irradiating UV light. It should be noted that depending on the material, the protective film 163 may be difficult to apply to the moisture absorption prevention film 152 by spin coating. In that case, the hard coating material may be atomized and sprayed on, or the optical disk may be passed through an atmosphere of the atomized material.

Figure 10:
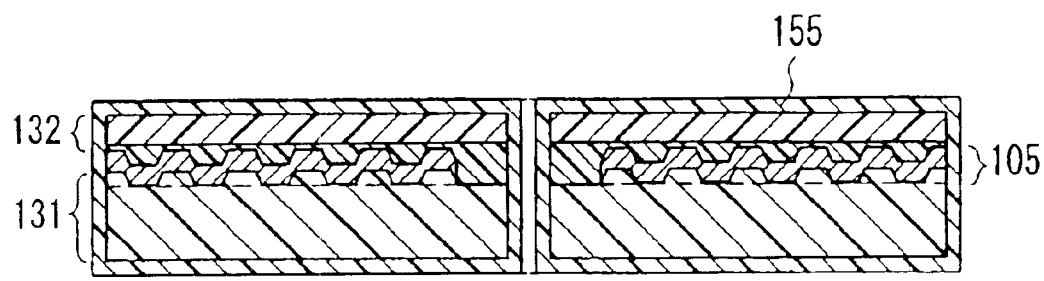
FIG. 10 is a cross-sectional view showing still another embodiment of an optical information recording medium according to the present invention.

As shown in FIG. 10, a moisture absorption prevention film 155 may also be formed covering the entire surface of the optical disk. Such a moisture absorption prevention film 155 suppresses the absorption and release of moisture not only on the principal surfaces, but also at the edge faces. The moisture absorption prevention film 155 can be formed by immersing the optical disk in a moisture absorption prevention film material in liquid form, or atomizing that material and blowing it on.

Figure 11A:
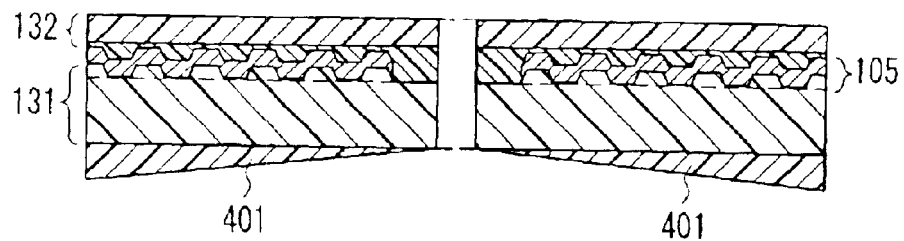
FIGS. 11A to 11D are cross-sectional views showing various kinds of moisture absorption prevention films in optical information recording media according to the present invention.

The moisture absorption prevention film does not necessarily have to be formed as a film of the same material with uniform thickness. For example, as shown in FIG. 11A, the moisture absorption prevention film 401 may be formed such that its thickness increases from the disk center in outward direction. Such a film can be formed by controlling the rotation speed when spin coating.

Figure 11B:
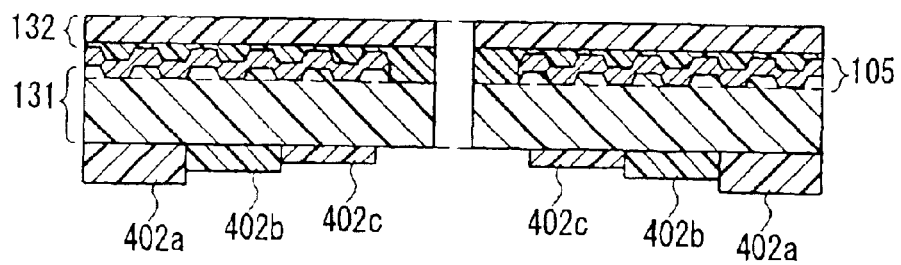
Figure 11C:
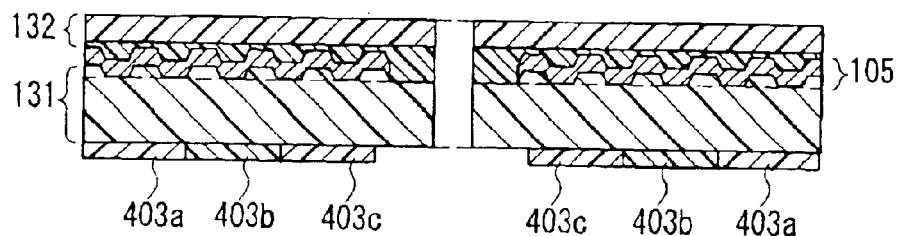
Figure 11D:
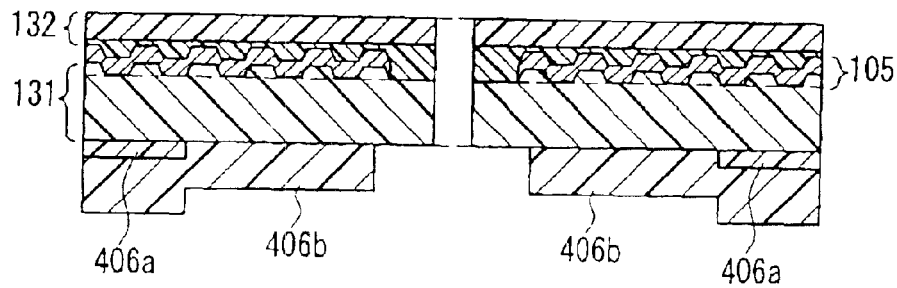

Depending on the material, the film stress and hardness of the moisture absorption prevention film may differ. Therefore, it is also possible to provide a plurality of band-shaped regions with moisture absorption prevention films 402a, 402b and 402c of suitable film thickness in accordance with the distance from the disk center, as shown in FIG. 11B for example, or to form moisture absorption prevention films 403a, 403b and 403c using suitable materials for each band-shaped region, as shown in FIG. 11C. As shown in FIG. 11D, it is also possible to partially layer a plurality of films 406a and 406b as the moisture absorption prevention film.

Figure 12:
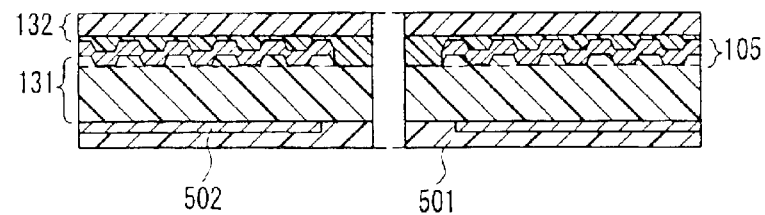
FIG. 12 is a cross-sectional view showing yet another embodiment of an optical information recording medium according to the present invention.

Furthermore, as shown in FIG. 12, a balance layer 501 made of the same material as the transparent resin layer 132 may be formed on the moisture absorption prevention film 502 formed on the resin substrate 131. In this optical disk, moisture is absorbed and released from the outer principal surface of the transparent resin layer 132 and the balance layer 501, which are exposed to the outside. It is preferable that the balance layer 501 is thinner than the resin substrate 131, and it is even more preferable that it is formed such that it has substantially the same thickness as the transparent resin layer 132. If it has substantially the same thickness, then the effect of humidity can be abated almost completely, and variations of the tilt angle can be substantially cancelled.

Figure 13:
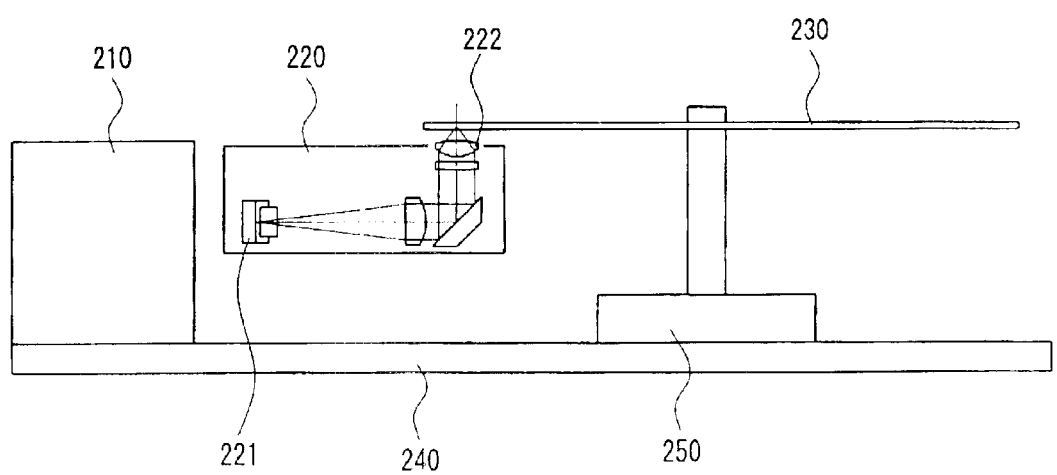
FIG. 13 is a diagram illustrating an example of a device used for recording and/or reproducing an optical information recording medium according to the present invention.

With the optical disk as explained above, it is possible to record and/or reproduce optical information using devices currently in use. An example of the configuration of such a device is shown in FIG. 13. The optical disk 230 is rotated at a predetermined speed by a motor 250 connected via a circuit board 240 to a power source 210. Laser light irradiated from a laser light source 221 on an optical pickup 220 is irradiated through an optical system including, for example, an objective lens 222. The medium of the present invention is suitable for recording and/or reproducing with laser light of a wavelength of at most 450 nm, for example about 400 nm, and a numerical aperture of the objective lens of at least 0.7, for example about 0.85.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. An optical information recording medium comprising:
   a transparent resin layer;
   a resin substrate that is thicker than the transparent resin layer; and
   an information recording layer disposed between the transparent resin layer and the resin substrate;
   wherein a moisture absorption prevention film is formed on only a portion of an outer principal surface of the resin substrate.

2. An optical information recording medium comprising:
   a transparent resin layer;
   a resin substrate that is thicker than the transparent resin layer; and
   an information recording layer disposed between the transparent resin layer and the resin substrate;
   wherein a first moisture absorption prevention film is formed on at least a portion of an outer principal surface of the resin substrate, and
   a second moisture absorption prevention film is formed on at least a portion of an outer principal surface of the transparent resin layer.

3. The optical information recording medium according to claim 2, wherein the first moisture absorption prevention film is formed covering the entire outer principal surface of the resin substrate, and the second moisture absorption prevention film is formed covering the entire outer principal surface of the transparent resin layer.

4. The optical information recording medium according to claim 2, wherein the second moisture absorption prevention film has a transmissivity of at least 90% with respect to laser light that is irradiated onto the information recording layer.

5. The optical information recording medium according to claim 1, wherein the moisture absorption prevention film comprises a dielectric material.

6. The optical information recording medium according to claim 5, wherein the moisture absorption prevention film comprises at least one material selected from oxides, nitrides and sulfides.

7. The optical information recording medium according to claim 6, wherein the moisture absorption prevention film comprises at least one material selected from $SiO_2$, $Al_2O_3$, SiN, AlN and ZnS as its principal component.

8. The optical information recording medium according to claim 1, wherein the moisture absorption prevention film comprises a resin material with a hygroscopicity that is lower than that of the material constituting the resin substrate.

9. The optical information recording medium according to claim 1, wberein the transparent resin layer comprises at least one resin selected from resins curable by radiation and adhesive resins.

10. The optical information recording medium according to claim 9, wherein the transparent resin layer further comprises a resin substrate on the outer side of said at least one resin selected from resins curable by radiation and adhesive resins.

11. The optical information recording medium according to claim 1, wherein the thickness of the resin substrate is at least three times larger than the thickness of the transparent resin layer.

12. The optical information recording medium according to claim 1, wherein the moisture absorption prevention film is formed with a predetermined pattern on a portion of the outer principal surface.

13. The optical information recording medium according to claim 12, wherein the predetermined pattern is a pattern of scattered dots, a mesh pattern or a band-shaped pattern.

14. The optical information recording medium according to claim 13, wherein the medium is disk-shaped, and the predetermined pattern is a band-shaped pattern.

15. The optical information recording medium according to claim 1, wherein the moisture absorption prevention film is formed on a region of at least 35% and at most 85% of the surface area of the outer principal surface.

16. The optical information recording medium according to claim 1, wherein the transparent resin layer comprises a protective layer as its outermost layer.

17. The optical information recording medium according to claim 1, wherein a balance layer made of the same material as the transparent resin layer is further formed on the outer side of the moisture absorption prevention film.

18. The optical information recording medium according to claim 1,
wherein the information recording layer serves as a first information recording layer; and
further comprising a second information recording layer disposed between the first information layer and the transparent resin layer, and a separation layer disposed between the first information recording layer and the second information recording layer.

19. A method for manufacturing the optical information recording medium according to claim 1, comprising:
forming at least the information recording layer on one of the two principal surfaces of the resin substrate;
forming the transparent resin layer such that the information recording layer is disposed between the resin substrate and the transparent resin layer;
disposing a scratch prevention film so as to cover the outer principal surface of the transparent resin layer;
forming a moisture absorption prevention film on the outer principal surface of the resin substrate while the scratch prevention film is still disposed; and
removing the scratch prevention film after forming the moisture absorption prevention film.

20. A method for recording and/or reproducing optical information on the optical information recording medium according to claim 1, wherein optical information is recorded and/or reproduced by irradiating laser light with a wavelength of at most 450 nm onto the information recording layer, taking the transparent resin layer as the incident side.

21. An optical information recording medium comprising:
a transparent resin layer;
a resin substrate that is thicker than the transparent resin layer;
an information recording layer disposed between the transparent resin layer and the resin substrate; and
a moisture absorption prevention film having a film area set in accordance with a thickness and a material of the resin substrate,
wherein the transparent resin layer is formed on at least a portion of an outer principal surface of the resin substrate.

* * * * *